Jan. 22, 1935. K. KORITTKE 1,988,951
VACUUM CLEANER
Filed July 28, 1933  2 Sheets-Sheet 2

Inventor
Karl Korittke
by Knight Bros
Attorneys

Patented Jan. 22, 1935

1,988,951

UNITED STATES PATENT OFFICE 1,988,951

VACUUM CLEANER

Karl Korittke, Berlin-Charlottenburg, Germany, assignor to Siemens-Schuckertwerke Aktiengesellschaft, Berlin-Siemensstadt, Germany, a corporation of Germany Application July 28, 1933, Serial No. 682,675
In Germany July 5, 1932

3 Claims. (Cl. 248—16)

My invention relates to improvements in vacuum cleaners, and more particularly to a noise damping device therefor.

It is known to those skilled in the art to mount the motor on noise damping materials, such as rubber, in order to dampen the noise produced in electric vacuum cleaners. In a well-known type of vacuum cleaner the rubber ring serving to damp the noise is applied to the casing of the vertically mounted motor and clamped to it by a cap or the like, a supporting member secured to the vacuum cleaner casing being embedded in the rubber ring.

By such an arrangement and design, the flexibility of the rubber ring is considerably impaired, since the rubber ring cannot sufficiently expand owing to its being firmly held in position by the cap in the radial direction and it thus cannot completely absorb the shocks and oscillations of the motor so as to permit a deformation of the rubber ring. In this manner the noise damping effect of the rubber ring is, consequently, materially impaired.

The object of my invention is to provide an improved noise damping device whereby the noise caused by the vibrations of the motor is damped in a more effective manner than by the devices hitherto employed. To this end, the rubber ring is provided with a number of recesses and so mounted as to permit its unrestricted expansion in radial direction. By arranging recesses in the rubber ring, the flexibility is considerably enhanced as compared to a solid ring, so that the shocks of the motor may be completely absorbed by the rubber ring, thus preventing a transfer of the shocks to the other parts of the vacuum cleaner. It is preferable to arrange the recesses in the upper part of the rubber ring, whereas in the lower part thereof a groove is provided in which a supporting member for the motor secured to the vacuum cleaner casing is embedded. By fastening the supporting member in the lower part of the rubber ring provided with recesses the rubber ring is stressed in compression by the motor weight in the axial direction in the portion of the rubber ring above the circular groove so that the oscillations and shocks occurring in the motor and which act as noise source may be properly absorbed and equalized.

In the accompanying drawings some embodiments of my invention are illustrated in diagrammatical form.

Figure 1:
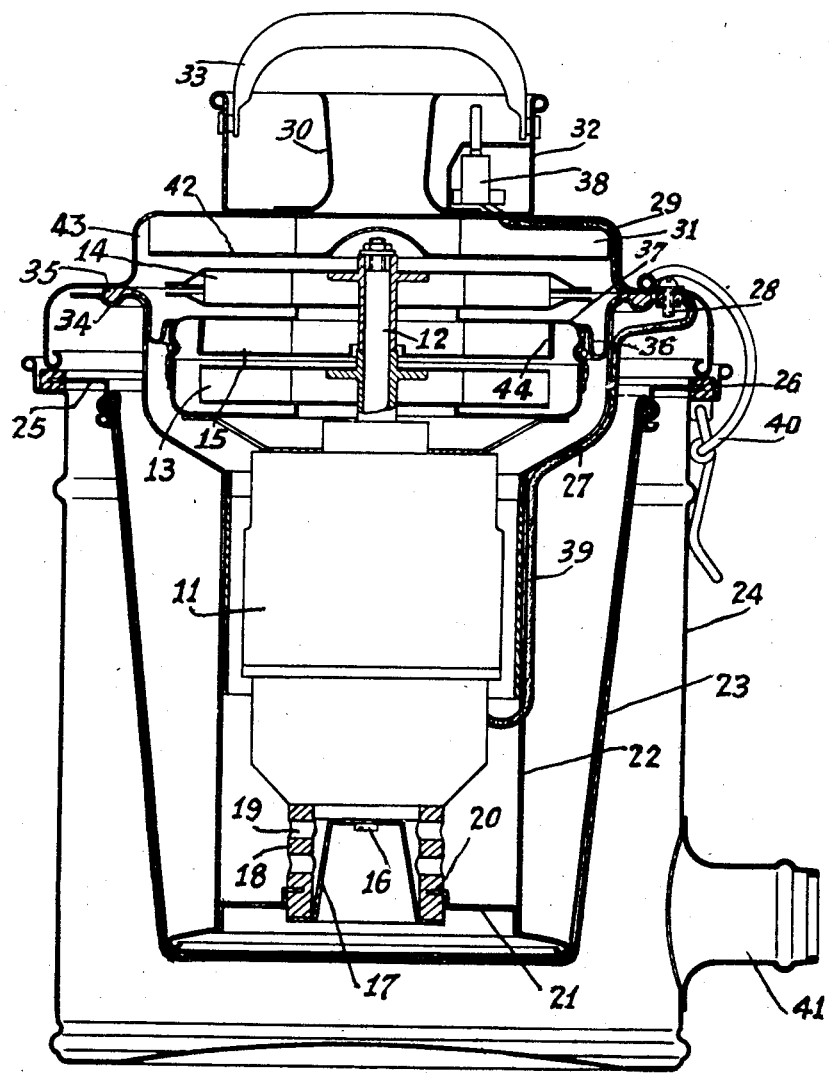
Fig. 1 shows a vertical sectional view of a vacuum cleaner embodying my invention.
Figure 2:
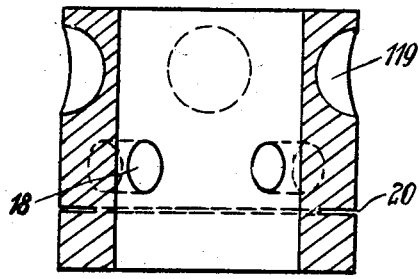
Fig. 2 shows an enlarged sectional view of a modified form of the noise damping ring.
Figure 3:
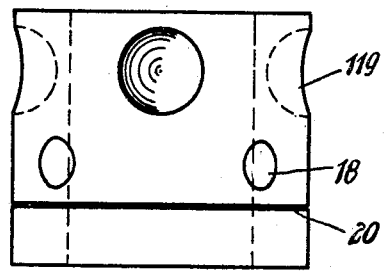
Fig. 3 is an enlarged outside view of the noise damping ring of Fig. 2, showing the recesses in staggered relation to one another
Figure 4:
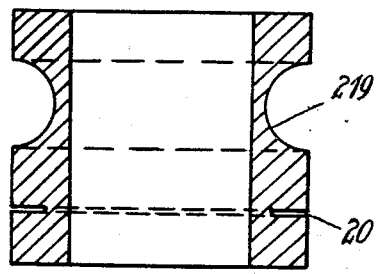
Fig. 4 shows another enlarged sectional view of the damping ring having at its upper part a deep annular groove instead of perforations.

Referring to Fig. 1, the motor 11 has a vertical shaft 12, whose upper end carries two centrifugal fans 13 and 14 between which a guide vane system 15 is arranged. A conical sheet-metal member 17, holding by its bottom flange a cylindrical rubber cylinder 18 in position against the motor, is secured at its top to the lower end of the motor 11 by means of the screw 16. The rubber cylinder is provided, as shown in Fig. 1, with two rows of perforations 19. Instead of the perforations 19 of Fig. 1, this cylinder may also be provided with deep semi-spherical recesses 119 as shown in Figs. 2 and 3, or with a deep groove 219 of semi-circular cross-section as shown in Fig. 4. Into the lower part of the rubber cylinder 18 a peripheral groove 20 is cut, in which the inner rim of a perforated sheet metal disk 21 is embedded, this disk thus serving as a support for cylinder 18 and motor 11. Disk 21 is secured near its outer periphery to the lower edge of a perforated supporting cylinder 22 and is formed at its periphery into a rim over which the filter 23 is stretched. This filter separates the suction chamber inside the filter from the dust chamber outside the filter. The latter consists of two filter bags of different fabric which are secured at their edges to a supporting ring 25 engaging a rubber ring 26 resting on the rim of the container 24. The supporting cylinder 22 is flared at its upper part as indicated at 27 and secured to the sheet-metal cover 29 of the vacuum cleaner by means of screws 28. The cover 29 forms the upper closure of the blower consisting of two ventilators 13 and 14 and of the guide vane system 15, said blower forcing the air drawn into the bag and up between the motor and cylinder 22, further upwardly and into the atmosphere through the outlet 30 arranged centrally on the cover 29. The air before passing through the outlet 30 is first directed through a stationary guide vane system 31, which is located in the interior of the casing cover 29 and separated from the motor by the sheet-metal disk 42 which forms with the inner peripheral wall of the cover 29 an annular gap 43. By this guide vane system 31 the whirling set up by the air issuing from the upper ventilator 14 is suppressed thus damping the noise to a great extent and enhancing the blower action. On the cover 29 a cable reel 32 is arranged on the outside of which the current supply cable may be wound. At the inside of reel 32 a handle 33 is pivotally attached to the reel wall. The upper flanged rim of the flaring portion 27 of the supporting cylinder 22 is secured to the casing cover 29 by means of screws 28. This flanged rim is provided with an annular groove 34, in which the outer thickened rim 35 of an annular rubber disk 36 is clamped. The latter is secured at its inner rim to the casing 37 of the guide vane system 15, and while permitting a free movement of the motor, seals the suction chamber against the pressure chamber of the blower. In this manner the cover 29 together with the motor and the blower form a unit, which can be lifted by handle 33 out of the outer container 24, in order to remove the dust collected in the latter and on the outside of bag 23. A motor switch 38, to which the motor supply lead 39 is connected is located within the cable reel 32. The supply lead 39 is secured to the inner wall of the casing cover 29 as well as to the supporting members 27 and 22 in such a manner that it does not affect in any way the passage of air. Furthermore, laying the wire in such a manner facilitates the accommodation of the supply lead within the vacuum cleaner. The cover 29 is firmly sealed to the container 24 by means of the rubber ring 26 previously mentioned, and which is compressed by toggle clamps 40 made of steel wire (only one clamp being shown in Fig. 1), whereby an air-tight closure of the interior of the vacuum cleaner against the outside atmosphere is attained. The inlet tube connection 41 is arranged at the lower part of container 24, which part constitutes the suction and dust chamber. To tube 41 the conventional flexible suction tube is attached, (not shown).

The oscillations caused by the motor are damped by means of the cylindrical rubber ring 18, since the latter has a great flexibility owing to the recesses 19 arranged therein. In this case it is of particular advantage to secure the rubber ring 18 to the lower bearing end shield of the motor 11, because in this manner the noise resulting in the bearing is damped at the point where it is generated and before it is transmitted to a greater surface which acts as noise emitting surface.

The resilient member provided according to the invention with recesses may also be used to the same advantage for vacuum cleaners of any type; for instance, with horizontal shaft. It may also be applied to any point of the motor casings; for instance, to particular extensions of the motor casing, as well as to other machines, where a silent operation is essential; for instance, to electric motors used for driving other domestic appliances and the like.

I claim as my invention:—

1. A noise damping arrangement for motor driven vacuum cleaners or the like, comprising a driving motor, a cylinder composed of resilient material and disposed to support the motor at one end, positioning element for said cylinder fixed to the motor and engaging the other end of said cylinder, said cylinder being grooved near said other end, and a motor carrier engaging said cylinder groove, said positioning element passing freely through the interior of said cylinder to provide space between the cylinder and the element to freely permit deformations of the cylinder caused by the motor vibrations.

2. A noise damping arrangement for motor driven vacuum cleaners or the like, comprising a driving motor, a rubber cylinder disposed in axial alignment and in contact with said motor for its support, a cone-shaped positioning element disposed within said cylinder and being fixed to said motor and engaging the outer end of said cylinder to press it against the motor, said cylinder being recessed at the portion near the motor and having a groove near its outer end, and a motor carrier engaging said cylinder groove, said positioning element passing freely through said cylinder to provide space between the cylinder and the element to freely permit deformations of the cylinder caused by the motor vibrations.

3. A noise damping device for motor driven vacuum cleaners, comprising a driving motor, a resilient member supportingly resting against said motor and having near its motor end staggered recesses consisting of perforations, an annular disk for supporting said resilient member and a conical positioning member passing through said resilient member and being secured to the casing of said motor and engaging the outer end of said resilient member to hold it against said motor, the inner rim of said disk engaging said groove to support said motor through said resilient member to dampen the oscillations caused by said motor.

KARL KORITTKE.